United States Patent [19]
Köhler et al.

[11] 4,432,139
[45] Feb. 21, 1984

[54] SAFETY DEVICE ON A POWER SAW

[75] Inventors: Gisbert Köhler, Fellbach; Hermann Weiss, Grossbottwar; Götz Landwehr, Berglen-Rettersburg, all of Fed. Rep. of Germany

[73] Assignee: Andreas Stihl, Waiblingen, Fed. Rep. of Germany

[21] Appl. No.: 315,487

[22] Filed: Oct. 27, 1981

[30] Foreign Application Priority Data

Oct. 28, 1980 [DE] Fed. Rep. of Germany ....... 3040516

[51] Int. Cl.³ .................... B27B 17/02; B27G 19/00
[52] U.S. Cl. ................................. 30/381; 30/382
[58] Field of Search .................... 30/381, 382, 383; 83/DIG. 1; 200/61.45 M

[56] References Cited

U.S. PATENT DOCUMENTS

| | | | |
|---|---|---|---|
| 2,890,303 | 6/1959 | Clurman | 200/61.45 M |
| 3,664,390 | 5/1972 | Mattsson | 30/381 |
| 4,026,177 | 5/1977 | Lokay | 83/DIG. 1 |
| 4,152,833 | 5/1979 | Phillips | 30/382 |

FOREIGN PATENT DOCUMENTS 2207244 8/1972 Fed. Rep. of Germany ........ 30/381

Primary Examiner—Jimmy C. Peters
Attorney, Agent, or Firm—Walter Ottesen

[57] ABSTRACT

A safety device on a power saw which is provided with two handles, especially for a power chain saw. The saw has a brake which engages a drive member of the cutting tool of the saw under the effect of a force retainer; the brake is held in the ineffective or inoperative position by a stop which is actuated by operating elements associated with the two handles. The stop is locked in its locking position and is releasable by means of an adjustment device which is driven by an energy source supplied by the engine of the saw, and is controlled by a control device which is connected to the operating elements which are embodied as key or contact switches.

24 Claims, 2 Drawing Figures

SAFETY DEVICE ON A POWER SAW

FIELD OF THE INVENTION

The present invention relates to a safety device on a power saw which is provided with two handles, especially on a power chain saw. The saw has a brake which engages a drive member of the cutting tool of the saw under the effect of a spring or other force retainer; the brake is held in the ineffective or inoperative position by a stop which is actuated by means of operating elements associated with the two handles.

BACKGROUND OF THE INVENTION

Considerable danger of accidents exists with power saws or power chain saws which are guided by hand at the two handles thereof. Recoil and kick-back movements can arise when working with such a saw as a result of suddenly encountered obstructions. These kick-backs can cause severe injury when the cutting tool, i.e. the saw chain in the case of a chain saw, is not immediately brought to a standstill. The danger of accident is especially great if one or both of the handles is released accidentally or even on purpose, because the saw then no longer can be safely guided. Consequently, different safety devices are known for such power saws. With the safety device disclosed in U.S. Pat. No. 3,793,727—Moore issued Feb. 26, 1974, a friction brake is associated with the drive sprocket or chain wheel of the saw chain. This friction brake is kept inoperative by means of a stop, which comprises several members of a linkage, so long as each of two levers which are coupled with the linkage is grasped at the same time as the two handles. When even one of the two handles is released, the lever associated therewith is pivoted and hence the stop is released, as a result of which the friction brake passes into its operating position under the effect of a pressure spring, and the saw chain is braked or stopped.

The continuous actuation of both levers by the linkage against the force of the pressure spring is tiring. Also, while working with the saw, the brake can be tightened or actuated without external cause, i.e. unnecessarily, if one of the handles is temporarily not tightly or firmly held. Additionally, the arrangement of the linkage requires an accurate adjustment and frequent servicing with readjustments, since the members of the linkage can become bent.

SUMMARY OF THE INVENTION

It is therefore an object of the present invention to embody a safety device in such a manner that the stop can be held in the operating position without special force application, but nonetheless can be released immediately even if only one of the two handles is released.

The safety device of the present invention is characterized primarily in that the stop is locked in its locking position and is releasable by means of an adjustment device which is driven by an energy source supplied by the engine of the saw, and is controlled by a control device, such as an electrical circuit, which is connected to the operating elements, which are embodied as key or contact switches.

With the safety device of the present invention, no special force application is necessary for maintaining the operating position of the saw, i.e. for the inoperative position of the brake, because the stop is locked in its locking position. This locking position is maintained as long as the contact switches associated with the two handles are touched by both hands. As soon as one of the two handles is released, the associated contact switch reverses, thus releasing the adjustment device by means of the control device. This adjustment device releases the stop, thus effecting tightening or application of the brake by the force retainer.

The stop can also be reset automatically into its locking position. For this purpose, according to a further embodiment of the inventive safety device, the stop may be coupled with a drivable resetting device, which likewise is controlled by the control device. A drive motor may be associated with the resetting device.

According to a preferred embodiment, it is also possible to additionally assure that the brake becomes effective even if during a dangerous kick-back movement of the chain both handles are still grasped, in which case too, serious accidents could occur. Therefore, according to a further development of the inventive safety device, the stop may additionally be released by a releasing member which is movable relative to the housing of the power saw; this releasing member already changes its position with respect to the saw housing by unintentional movements of the hand, preferably however by mass inertia, consequently releasing the stop and bringing the brake to a drawn or tightened state.

According to further specific embodiments of the present invention, the energy source may be a generator driven by the engine of the saw. The generator may be provided as a common energy source for the drive of the adjustment device and the resetting device, as well as for the current supply for the control device.

The releasing member may be a lever which, during recoil or kick-back of the power saw, is pivotable relative to the housing by mass inertia. The lever may be arranged in the direct vicinity of one of the handles.

If one of the two handles is arranged on top of the housing of the power saw, the contact switch on this upper handle may comprise a number of individual keys, the contacts of which are connected in parallel.

If a gas throttle for the internal combustion engine of the saw is arranged on one of the two handles, a throttle lock may be associated with the contact switch of this handle.

The adjustment device for the lock may be a lifting magnet, the push rod of which engages a lever of the lock; in the supply current circuit of the lifting magnet, the contact switches of both handles are located in series.

The adjustment device and the resetting device may be alternately switched on by a relay, the winding of which is connected in series with the contact switches.

The resetting device may have an adjusting nut which can be shifted by means of a spindle; two limit switches may be associated with the adjusting nut.

The drive motor of the resetting device can be turned on and off, and its direction of rotation can be reversed, by means of limit switches included in the control device.

A safety switch may be associated with the additional releasing member; upon actuation of this switch by the releasing member, the drive of the resetting device is locked by the control device.

The key or contact switches may be embodied as capacitive-operating sensors.

BRIEF DESCRIPTION OF THE DRAWING

The invention will now be described with reference to the drawing wherein.

DESCRIPTION OF THE PREFERRED EMBODIMENTS OF THE INVENTION

Figure 1:
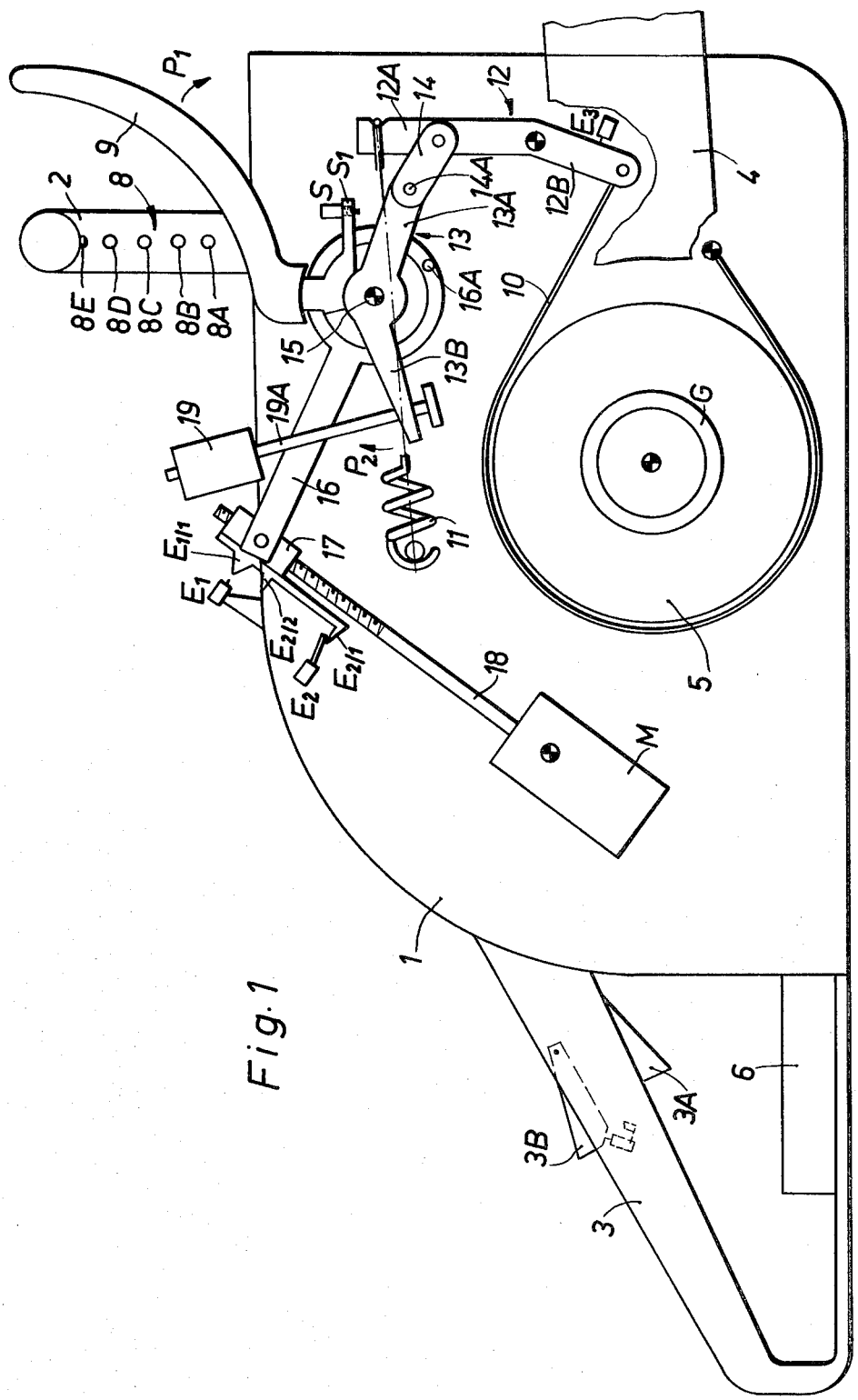
FIG. 1 is a schematic side elevation view of a power-driven chain saw according to the invention; and, FIG. 2 is a circuit diagram of the control device and a schematic representation of the equipment with which the control device coacts.
Figure 2:
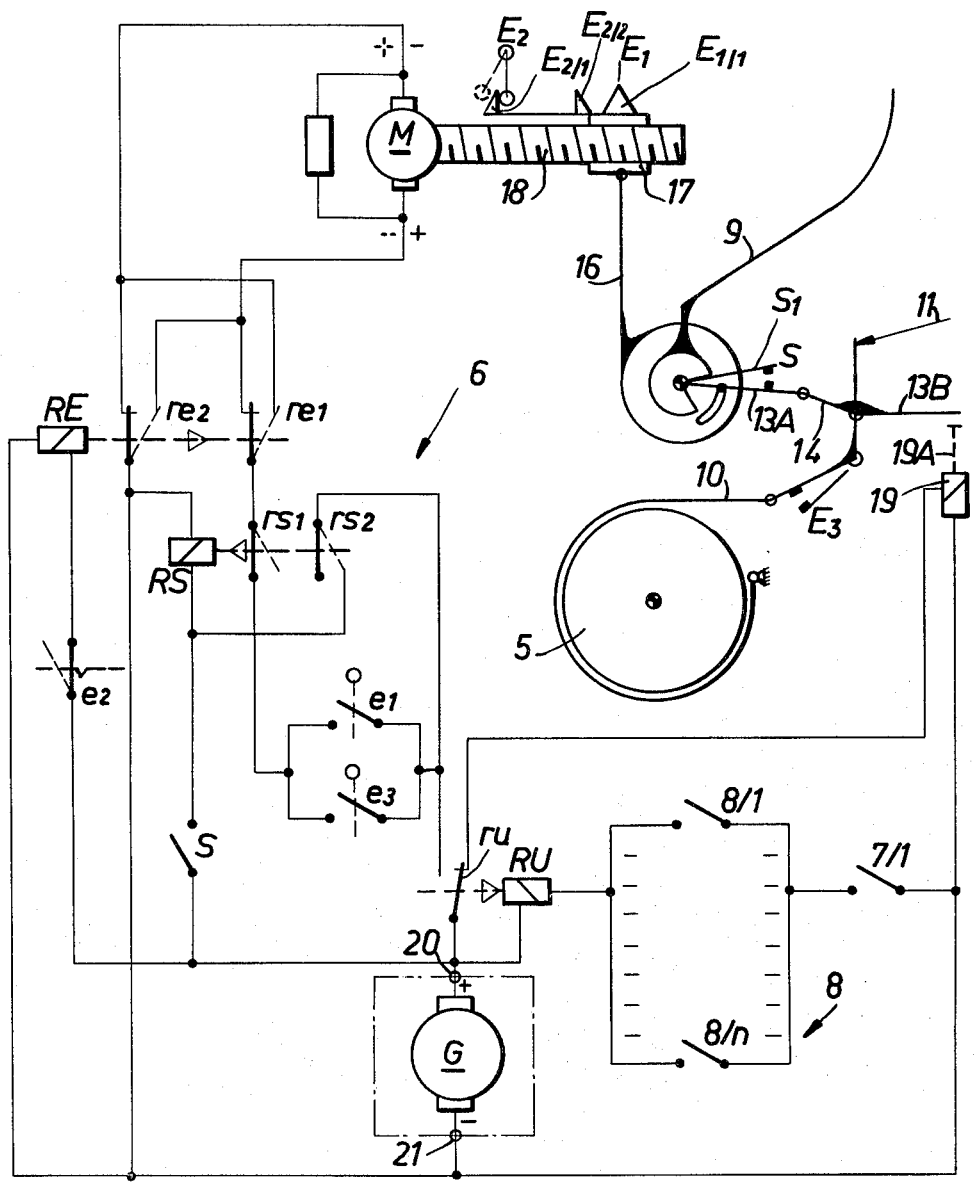

Referring now to the drawings in detail, the power chain saw of FIG. 1 has a housing 1 with two hand grips or handles 2 and 3, as well as a saw guide bar or rail 4, which is only indicated schematically. A saw chain runs conventionally over the guide bar and is driven by a chain or sprocket wheel (not illustrated). A brake drum 5 and a generator G are arranged coaxially with the chain sprocket, and the generator G is driven by the non-illustrated internal combustion engine of the saw. The generator G supplies current so that the handles 2 and 3 can be electrically heated. Additionally, the generator G serves to supply current to a control circuit 6, which is only schematically indicated in FIG. 1, but is shown in further detail in FIG. 2. The control circuit 6 in the embodiment comprises an electrical circuit which can also be installed or accommodated in the rear handle 3. A throttle trigger 3A is located on this handle and serves to control the internal combustion engine; a locking lever 3B is associated with the throttle trigger 3A in such a way that the latter can only be actuated when the lever 3B is also pressed. This locking lever 3B actuates a switch 7 arranged within the handle 3; the switch 7 is part of the control device or circuitry 6. The other handle 2 extends above the housing 1 transverse to the guide bar 4 and includes a switch means 8 which comprises several individual switches electrically connected in parallel with each other as shown in FIG. 2; these switches 8A, 8B, 8C, 8D, and 8E being schematically illustrated in FIG. 1 as to their location on the handle 2. These individual switches, and also the switch 7, are embodied as contact or key switches, the keys of which can be capacitive-operating sensors, or can also be pressure keys or pushbuttons. For the switching mechanism, a type of microswitch construction is expediently utilized.

In the direct vicinity of the handle 2 is located a protective guard 9 which, as a consequence of its mass inertia, becomes operative during a kick-back or recoil movement of the saw, and serves as the releasing or triggering member for a safety device, which includes a brake band 10 looped around the brake drum 5. During the normal operating condition of the saw, this brake band 10 does not engage the brake drum 5. A tension spring 11 engages one arm 12A of an angle lever 12, on the other arm 12B of which the brake band 10 is secured. The angle lever 12 is held in the illustrated position against the force of the spring 11, and in this position the brake band 10 does not engage the brake drum 5.

A knee lever 13, 14 is provided for locking the brake, with the two levers thereof comprising an arm 13A of an angle lever 13, and a link member 14 which is pivotably connected to the lever arm 12A of the angle lever 12. Both levers 13 and 14 are pivotable about the knee linkage or joint 14A, and consequently can be brought out of the illustrated stable position thereof, beyond the extended position, into an opposite likewise stable position. The angle lever 13 is pivotable about an axis or shaft 15, and is rigidly connected with the protective guard 9. The angle lever 13, together with the link 14 of the knee lever and the angle lever 12, form a barrier or stop which holds the brake band 10 in the illustrated position, and which can be released by pivoting the protective guard 9 in the direction of the arrow P1. If the chain saw is thrown rearwardly by a recoil, and/or is thrown upwardly about an imaginary pivot axis, the guard 9, as a consequence of its mass inertia, pivots relative to the saw housing 1 in the direction P1, thus releasing the stop or barrier, so that the brake band 10 frictionally engages the drum 5, and the drive of the chain sprocket is immediately braked or stopped. The same effect or result occurs when the other arm 13B of the angle lever 13 is pivoted upwardly in the direction of the arrow P2. For this purpose, the push rod or plunger 19A of a solenoid or lifting magnet 19 engages the arm 13B.

A lever 16 is freely rotatable about the axis 15, and supports a pin 16A on a ring which is concentric to the axis 15. A lock nut or adjusting nut 17 is connected to the lever 16, and a threaded spindle 18 engages therein. The spindle 18 is rotated by a motor M. Two limit switches E1 and E2 are arranged on the housing 1, and actuating members E1/1 and E2/2 on the adjusting nut 17 are respectively associated with the limit switches. A further limit switch E3 is arranged on the housing 1 in the vicinity of the angle lever 12, and is actuated by the lever arm 12B thereof. Additionally located on the housing 1 is a switch S which is located in the path of an arm S1 of the protective guard 9.

The position of the described parts illustrated in FIG. 1 corresponds to the operating position of the saw, in which the key or contact switches 7 and 8 are actuated by grasping the handles 2 and 3.

FIG. 2 shows the control device for the adjustment devices 16, 17, 18 and 19, 19A. The push rod 19A of the lifting magnet 19 is here only schematically indicated, with the arm 13B of the angle lever 13 being shown separate from the lever arm 14A for simplification of the illustration. Also the remaining mechanical parts are only schematically shown, but are provided with the same reference numerals as in FIG. 1.

The generator G, which is driven by the motor of the saw, delivers by way of a Grätz or bridge rectifier (not illustrated) a DC voltage to the output terminals 20 and 21. The individual switches of the key or contact switch 8 each have a contact 8/1 through 8/n, which are all connected in parallel. Only the two contacts 8/1 and 8/n are illustrated in FIG. 2, with the remaining contacts being schematically indicated. A contact 7/1 of the key or contact switch 7, as well as the winding of a relay RU, which has a normally closed contact ru, are in series with this contact arrangement. If the contact 7/1 and at least one of the contacts 8/1 through 8/n are closed, no current can flow from the generator G through the winding of the lifting magnet 19, because the normally closed contact ru of the relay RU is then open. FIG. 2 shows the condition of the switch arrangement for the situation when the contacts 8/1 through 8/n and/or the contacts 7/1 have been opened, i.e. when one or both of the handles 2 or 3 have been released. The normally closed contact ru of the relay RU is then in the illustrated position, and current flows from the generator G through the winding of the lifting magnet 19, so that the push rod 19A is drawn in and takes along the lever 13B of the angle lever 13 in the direction of the arrow B2 (see FIG. 1). Consequently, the knee lever 13A, 14 can be pushed through downwardly, beyond its extended position, whereby the joint 14A pivots downwardly, so that the tension spring 11 can pivot the angle lever 12, and the brake band 10 is pulled taut around the brake drum 5.

In order to release the brake, the contact 7/1 and at least one of the contacts 8/1 through 8/n must be closed, i.e. both handles must again be grasped. As a result, the contact ru of the relay RU abruptly reverses, thereby completing a circuit from the generator G through the drive motor M of the threaded spindle 18. In this circuit is located the contact e3 of the switch E3, which while drawing-up the brake was closed by the lever arm 12B of the angle lever 12. The current from the generator G flows through this contact, a normally closed contact rs1 of a relay RS, a normally closed contact re1 of a relay RE, the winding of the motor M, and back through a second normally closed contact re2 of the relay RE to the generator G. After the motor M has started, the adjusting nut 17 moves in the direction toward the motor M, and the actuating member E1/1 of the adjusting nut leaves the limit switch E1, the contact e1 of which is consequently closed. Since the adjusting nut 17 pivots the lever 16, the previously clockwise pivoted lever arm 13A of the angle lever 13 is taken along by the pin 16A of the lever 16, so that the angle lever 12 is pivoted back or returned against the force of the tension spring 11, and the contact e3 of the limit switch E3 is opened. The current flows further through the now closed contact e1, so that the motor M continues to run. The angle lever 12 is increasingly pivoted, and the spring 11 is tensioned. As soon as the actuating member E2/2 reaches the limit switch E2, the working or operating contact e2 thereof is closed, and current flows through the relay RE. Both contacts re1 and re2 of this relay RE accordingly shift, so that the current direction through the motor M, and hence the direction of rotation thereof, is reversed. At the moment of rotational reversal, the stop (basically 12, 13 and 14) has again reached the starting position illustrated in FIG. 1, and the lever 16 is now returned by the adjusting nut 17. When the actuating member E1/1 reaches the limit switch E1, the contact e1 thereof is opened, so that no current can any longer flow through the motor M, which is consequently brought to a standstill. Simultaneously the operating contact e2 is opened by the actuating member E2/1 of the nut 17.

Since the brake can also be actuated by the described relative movement of the protective guard 9, it is necessary to assure that the resetting device in this situation does not start automatically when the handles are still grasped, i.e. when the switches 7 and 8 are actuated. Since the limit switch E3 is also closed upon actuation of the brake by means of the protective guard 9, the resetting device would then be actuated. In order to preclude this from happening, the switch S is provided, which is actuated, during pivoting of the protective guard 9, by the arm S1 thereof. As a result, the contact s of this switch S is closed, and current flows from the generator G through the relay RS, the normally closed contacts rs1 and rs2 of which are then opened. The contact rs2 is a holding contact, by means of which the relay RS is held in the actuated position, even when the switch S is opened again during return pivoting of the protective guard 9. The motor M accordingly cannot receive any current so long as the contact rs1 of the relay RS remains open. To release the brake again, it is sufficient to briefly release one of the handles, so that the relay RU reverses, whereby the holding circuit of the relay RS is interrupted. When the handle is again grasped, the relay RU again reverses, and the resetting procedure occurs as described.

The arrangement of the key or contact switches thus makes possible the automatic braking of the drive of the saw chain by releasing one of the handles, and also permits the combination thereof with the protective guard 9, which by its mass inertia releases the brake during kick-back of the saw. The resetting device can be made effective or actuated in a simple manner, regardless of whether braking has occurred by releasing one of the handles, or solely as a result of kick-back and the mass inertia of the guard. The arrangement of the contact switches in the handles assures that the saw chain can only be driven when both handles are actually grasped. In this connection, the arrangement of several individual contact switches electrically in parallel on the upper handle 2 is especially expedient, because the user of the saw is consequently not bound to any particular position of the hand in relation to the handle 2. For the handle 3, a single contact switch suffices, since the throttle-locking lever 3B must be actuated in any event to operate the saw, i.e. to this extent a particular hand position is necessary. It would however also be possible to provide a similar series arrangement of contact switches on the handle 3.

The present invention is, of course, in no way restricted to the specific disclosure of the specification and drawings, but also encompasses any modifications within the scope of the appended claims.

What I claim is:

1. A safety device for a power saw which has a housing to which are attached two handles, and also has an engine, a cutting tool, a drive member associated with said engine and said cutting tool, and a brake which in its operative position engages said drive member under the effect of a spring or other force retainer to stop the movement of said cutting tool, said safety device comprising:
    a stop associated with said housing for holding said brake in an inoperative position while said stop is in a locked position:
    an adjustment device associated with said housing and said stop for releasing the latter from its locked position when said adjustment device is actuated;
    an energy source, associated with said housing and energized by said saw engine, for driving said adjustment device;
    an electric control device, associated with said housing for controlling said adjustment device;
    operating elements in the form of contact switches respectively associated with said handles and said control device for actuating said adjustment device; and,
    a drivable resetting device which is coupled with said stop and is also controlled by said control device.

2. A safety device according to claim 1, in which said resetting device is operatively connected to a drive motor, which in turn is connected to said control device.

3. A safety device according to claim 2, in which said energy source is a generator.

4. A safety device according to claim 3, in which said generator is a common energy source for said drive motor of said resetting device, for said adjustment device, and for current supply for said control device.

5. A safety device according to claim 4, which further includes a releasing member which is movable relative to said housing and serves as an additional means for releasing said stop from its locked position.

6. A safety device according to claim 5, in which said releasing member is a lever which, during kick-back of said power saw, is pivotable relative to said housing by means of mass inertia.

7. A safety device according to claim 6, in which said lever is arranged in the direct vicinity of one of said handles.

8. A safety device for a power saw which has a housing to which are attached two handles, and also has an engine, a cutting tool, a drive member associated with said engine and said cutting tool, and a brake which in its operative position engages said drive member under the effect of a spring or other force retainer to stop the movement of said cutting tool, said safety device comprising:
   a stop associated with said housing for holding said brake in an operative position while said stop is in a locked position;
   an adjustment device associated with said housing and said stop for releasing the latter from its locked position when said adjustment device is actuated;
   an energy source in the form of a generator, associated with said housing and energized by said saw engine, for driving said adjustment device;
   an electric control device, associated with said housing for controlling said adjustment device;
   operating elements in the form of contact switches respectively associated with said handles and said control device for actuating said adjustment device;
   a drivable resetting device which is coupled with said stop and is also controlled by said control device, said resetting device being operatively connected to a drive motor, which in turn is connected to said control device;
   said generator being a common energy source for said drive motor of said resetting device, for said adjustment device, and for current supply for said control device;
   a releasing member which is movable relative to said housing and serves as an additional means for releasing said stop from its locked position, said releasing member being a lever which, during kick-back of said power saw, is pivotable relative to said housing by means of mass inertia, said lever being arranged in the direct vicinity of one of said handles; and,
   one of said handles being arranged on top of said housing, and said contact switch associated with said top handle includes a plurality of individual keys, the contacts of which are connected in parallel.

9. A safety device according to claim 8, which includes a gas throttle, for said saw engine, arranged on one of said handles, that contact switch associated with said last mentioned handle being provided with a throttle lock.

10. A safety device according to claim 9, in which said adjustment device is a lifting magnet provided with a push rod, and in which said stop includes a lever engaged by said push rod to effect release of said stop from its locked position, said lifting magnet being supplied by a circuit which includes, in series, said contact switches of said handles.

11. A safety device according to claim 10, which includes a relay, the winding of which is connected in series with said contact switches, said adjustment device and said resetting device being alternately turned on by said relay.

12. A safety device according to claim 11, in which said resetting device includes a spindle which is operatively connected to said drive motor, and an adjusting nut which is shiftable by said spindle, and which further includes two limit switches associated with said adjusting nut.

13. A safety device according to claim 12, in which said limit switches form a part of said control device for turning said drive motor on and off, and for reversing the direction of said drive motor.

14. A safety device according to claim 13, which includes a safety switch associated with and actuated by said releasing member, said drive motor of said resetting device being locked via said control device upon actuation of said safety switch.

15. A safety device according to claim 14, in which said contact switches are capacitive-operating sensors.

16. A power-driven chain saw comprising:
   a housing equipped with two handles both of which are grasped by the operator to hold and guide the tool during use thereof;
   a movable cutting tool mounted on said housing for performing cutting operations on a workpiece;
   a motor for driving said cutting tool; and,
   a safety arrangement including:
   resettable brake means mounted on said housing for arresting the movement of said cutting tool;
   latching means connected to said brake means and being movable between a first position wherein said brake means is latched during normal operation of the chain saw and a second position wherein said brake means is actuated to arrest the movement of said cutting tool in response to a predetermined condition;
   latch release means for acting upon said latching means to cause the latter to move from said first position to said second position thereby rapidly actuating said brake means to immediately arrest the movement of said cutting tool;
   brake resetting means for acting upon said latching means to cause the latter to move from said second position to said first position thereby acting upon said brake means to release said cutting tool to again permit movement thereof while at the same time resetting said brake means;
   first and second switch means mounted on said two handles, respectively, and actuable by the operator of the chain saw when grasping said handles, said first and second switch means being interconnected to provide a first circuit condition when the operator releases one of said handles and to provide a second circuit condition when the operator again grasps both of said handles; and,
   control circuit means connected to said first and second switch means for selectively controlling and actuating said latch release means in response to said first conduit condition and for controlling and actuating said brake resetting means in response to said second circuit condition.

17. The power-driven chain saw of claim 16 wherein said safety arrangement comprises: an ancillary safety device responsive to a kickback condition, the device including:
- inertia responsive lever means for acting on said latching means to cause the latter to move from said first position to said second position thereby rapidly actuating said brake means to immediately arrest the movement of said cutting tool; and,
- interrupting circuit means forming part of said control circuit means for preventing the latter from actuating said brake resetting means in response to the action of said inertia responsive lever means.

18. The power-driven chain saw of claim 17 wherein said ancillary safety device includes disabling circuit means for disabling said interrupting circuit means in response to said first circuit condition.

19. A power-driven chain saw comprising:
- a housing equipped with two handles both of which are grasped by the operator to hold and guide the tool during use thereof;
- a movable cutting tool mounted on said housing for performing cutting operations on a workpiece;
- a motor for driving said cutting tool; and,
- a safety arrangement including:
- resettable brake means mounted on said housing for arresting the movement of said cutting tool;
- latching means connected to said brake means and being movable between a first position wherein said brake means is latched during normal operation of the chain saw and a second position wherein said brake means is actuated to arrest the movement of said cutting tool in response to a predetermined condition;
- electromagnetically-actuated latch release means for acting upon said latching means to cause the latter to move from said first position to said second position thereby rapidly actuating said brake means to immediately arrest the movement of said cutting tool;
- electromagnetic brake resetting means for acting upon said latching means to cause the latter to move from said second position to said first position thereby acting upon said brake means to release said cutting tool to again permit movement thereof while at the same time resetting said brake means;
- first and second switch means mounted on said two handles, respectively, and actuable by the operator of the chain saw when grasping said handles, said first and second switch means being interconnected to provide a first circuit condition when the operator releases one of said handles and to provide a second circuit condition when the operator again grasps both of said handles; and,
- control circuit means including:
- a generated mounted in said housing and driven by said motor;
- first circuit means connected to said electromagnetically-actuated latch release means;
- second circuit means connected to said electromagnetic brake resetting means; and,
- control circuit switching means connected to said first and second switch means for selectively: directing current from said generator to said electromagnetically-actuated latch release means via said first circuit means in response to said first circuit condition thereby actuating said latch release means and, directing current from said generator to said electromagnetic brake resetting means via said second circuit means in response to said second circuit condition thereby energizing said brake resetting means.

20. The power-driven chain saw of claim 19 wherein said safety arrangement comprises: an ancillary safety device responsive to a kickback condition, the device including:
- inertia responsive lever means for acting on said latching means to cause the latter to move from said first position to said second position thereby rapidly actuating said brake means to immediately arrest the movement of said cutting tool; and,
- interrupting circuit means forming part of said second circuit means for preventing the latter from energizing said brake resetting means in response to the action of said inertia responsive lever means.

21. The power-driven chain saw of claim 20 wherein said ancillary safety device includes disabling circuit means for disabling said interrupting circuit means in response to said first circuit condition.

22. A power-driven chain saw comprising:
- a housing equipped with two handles, both of which are grasped by the operator to hold and guide the tool during use thereof;
- a movable cutting tool mounted on said housing for performing cutting operations on a workpiece;
- a motor for driving said cutting tool; and,
- a safety arrangement including:
- resettable brake means mounted on said housing for arresting the movement of said cutting tool; said brake means including: a brake drum connected to said cutting tool; a brake band disposed in surrounding relationship to said brake drum and having one end connected to said housing; and, spring means for storing the energy to apply said band to said brake drum;
- latching means including articulated lever means connected to said spring means and the other end of said brake band also being connected to said lever means; said lever means being movable from a first blocked position wherein said spring means is charged and said brake band is loose about said brake drum to a second position whereat said spring means acts upon said lever means to tighten said brake band about said drum;
- latch release means for acting upon and unblocking said lever means to cause the latter to move from said first position to said second position thereby rapidly actuating said brake means to tighten said brake band about said drum to immediately arrest the movement of said cutting tool;
- brake resetting means for acting upon said lever means to cause the latter to move from said second position to said first position thereby acting upon said brake means to release said cutting tool to again permit movement thereof while at the same time resetting said brake means;
- first and second switch means mounted on said two handles, respectively, and actuable by the operator of the chain saw when grasping said handles, said first and second switch means being interconnected to provide a first circuit condition when the operator releases one of said handles and to provide a second circuit condition when the operator again grasps both of said handles; and,
- control circuit means connected to said first and second switch means for selectively controlling and actuating said latch release means in response to said first circuit condition and for controlling said actuating said brake resetting means in response to said second circuit condition.

23. The power-driven chain saw of claim 22 wherein said safety arrangement comprises: an ancillary safety device responsive to a kickback condition, the device including:

inertia responsive lever means for acting on said articulated lever means to cause the latter to move from said first position to said second position thereby rapidly actuating said brake means to immediately arrest the movement of said cutting tool; and, interrupting circuit means forming part of said control circuit means for coating therewith for preventing the latter from actuating said brake resetting means in response to the action of said inertia responsive lever means.

24. The power-driven chain saw of claim 23 wherein said ancillary safety device includes disabling circuit means for disabling said interrupting circuit means in response to said first circuit condition.

* * * * *

UNITED STATES PATENT AND TRADEMARK OFFICE
CERTIFICATE OF CORRECTION

PATENT NO. : 4,432,139

DATED : February 21, 1984

INVENTOR(S) : Gisbert Köhler, Hermann Weiss and Götz Landwehr

It is certified that error appears in the above-identified patent and that said Letters Patent is hereby corrected as shown below:

In column 8, line 64: delete "conduit" and substitute -- circuit -- therefor.

In column 9, line 55: delete "generated" and substitute -- generator -- therefor.

In column 11, line 1: between the words "controlling" and "said", insert -- and actuating --.

In column 12, line 4: delete "coating" and substitute -- coacting -- therefor.

Signed and Sealed this

Seventeenth Day of July 1984

[SEAL]

Attest:

*Attesting Officer*

GERALD J. MOSSINGHOFF

*Commissioner of Patents and Trademarks*